(12) United States Patent  (10) Patent No.: US 9,160,913 B2
Ito  (45) Date of Patent: Oct. 13, 2015

(54) IMAGE MATCHING SYSTEM, PROVIDING APPARATUS, IMAGING APPARATUS, IMAGE MATCHING METHOD, AND PROGRAM

(75) Inventor: Kan Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 12/881,636

(22) Filed: Sep. 14, 2010

(65) Prior Publication Data

US 2011/0069863 A1 Mar. 24, 2011

(30) Foreign Application Priority Data

Sep. 18, 2009 (JP) ................ 2009-217331

(51) Int. Cl.
G06K 9/62 (2006.01)
H04N 5/232 (2006.01)
G06K 9/00 (2006.01)
G06K 9/66 (2006.01)

(52) U.S. Cl.
CPC ............ *H04N 5/232* (2013.01); *G06K 9/00979* (2013.01); *G06K 9/66* (2013.01); *H04N 5/23206* (2013.01); *H04N 5/23219* (2013.01)

(58) Field of Classification Search
CPC ..... G06K 9/00979; G06K 9/66; H04N 5/232; H04N 5/23206; H04N 5/23219
See application file for complete search history.

(56) References Cited

U.S. PATENT DOCUMENTS

| 7,044,370 | B2 * | 5/2006 | Bellis et al. | ........... 235/383 |
| 8,345,927 | B2 * | 1/2013 | Ishikawa et al. | ........... 382/106 |
| 2002/0196962 | A1 * | 12/2002 | Fukuhara et al. | ........... 382/103 |
| 2005/0224573 | A1 | 10/2005 | Yoshizane et al. | |

FOREIGN PATENT DOCUMENTS

| JP | 2002-374519 A | 12/2002 |
| JP | 2004-254236 A | 9/2004 |
| JP | 2007-158421 A | 6/2007 |

* cited by examiner

*Primary Examiner* — Matthew Bella
*Assistant Examiner* — Elisa Rice
(74) *Attorney, Agent, or Firm* — Canon U.S.A., Inc. IP Division

(57) ABSTRACT

An image matching system in which an imaging apparatus configured to capture an image and a storage unit configured to store matching information are connected to each other via a network and the imaging apparatus performs matching between the matching information and the captured image includes a selection unit configured to select, from among the matching information stored in the storage unit, matching information corresponding to predetermined time, and an updating unit configured to update the matching information to be used by the imaging apparatus to perform matching with the captured image with the matching information selected by the selection unit.

25 Claims, 10 Drawing Sheets

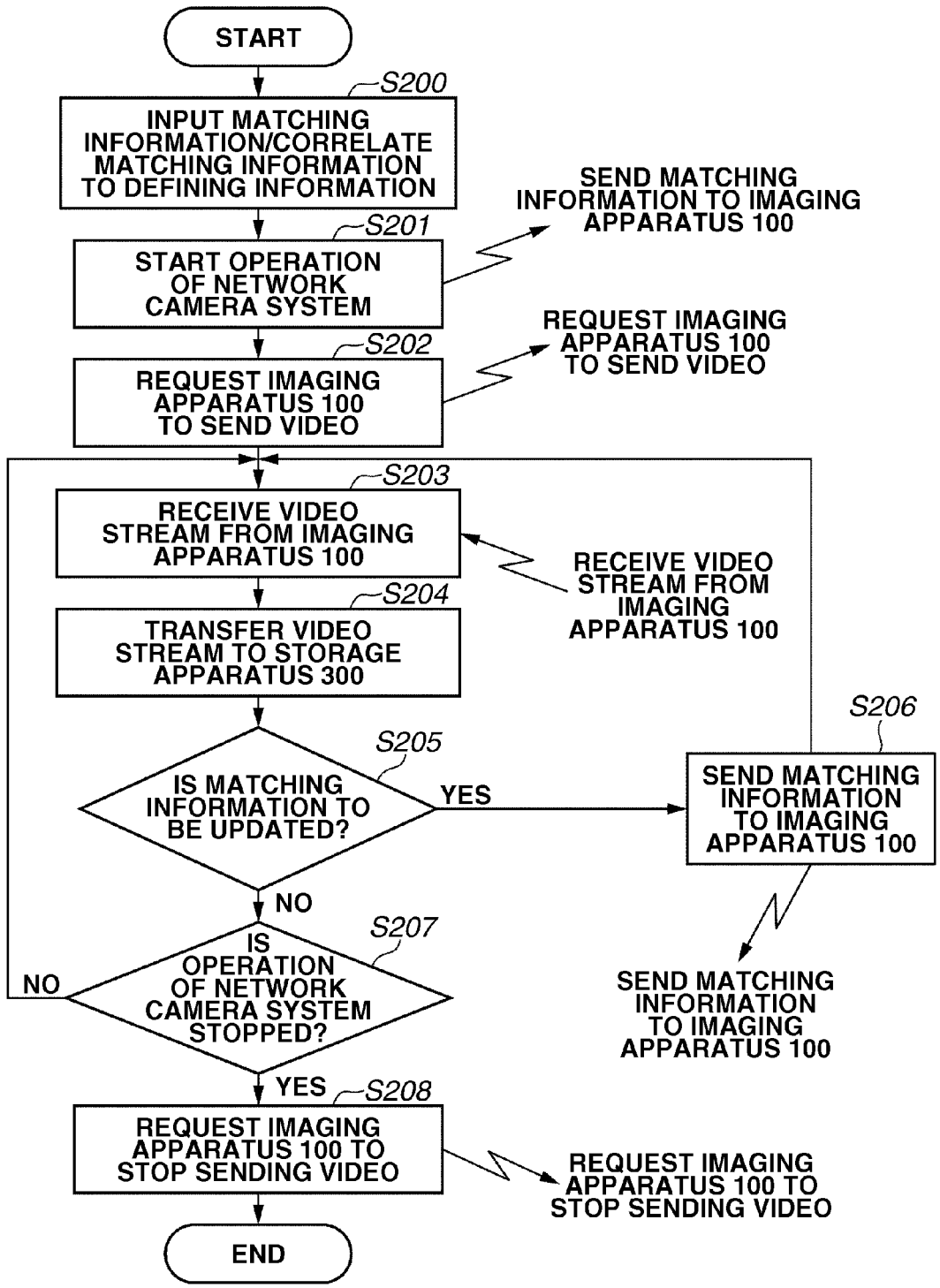

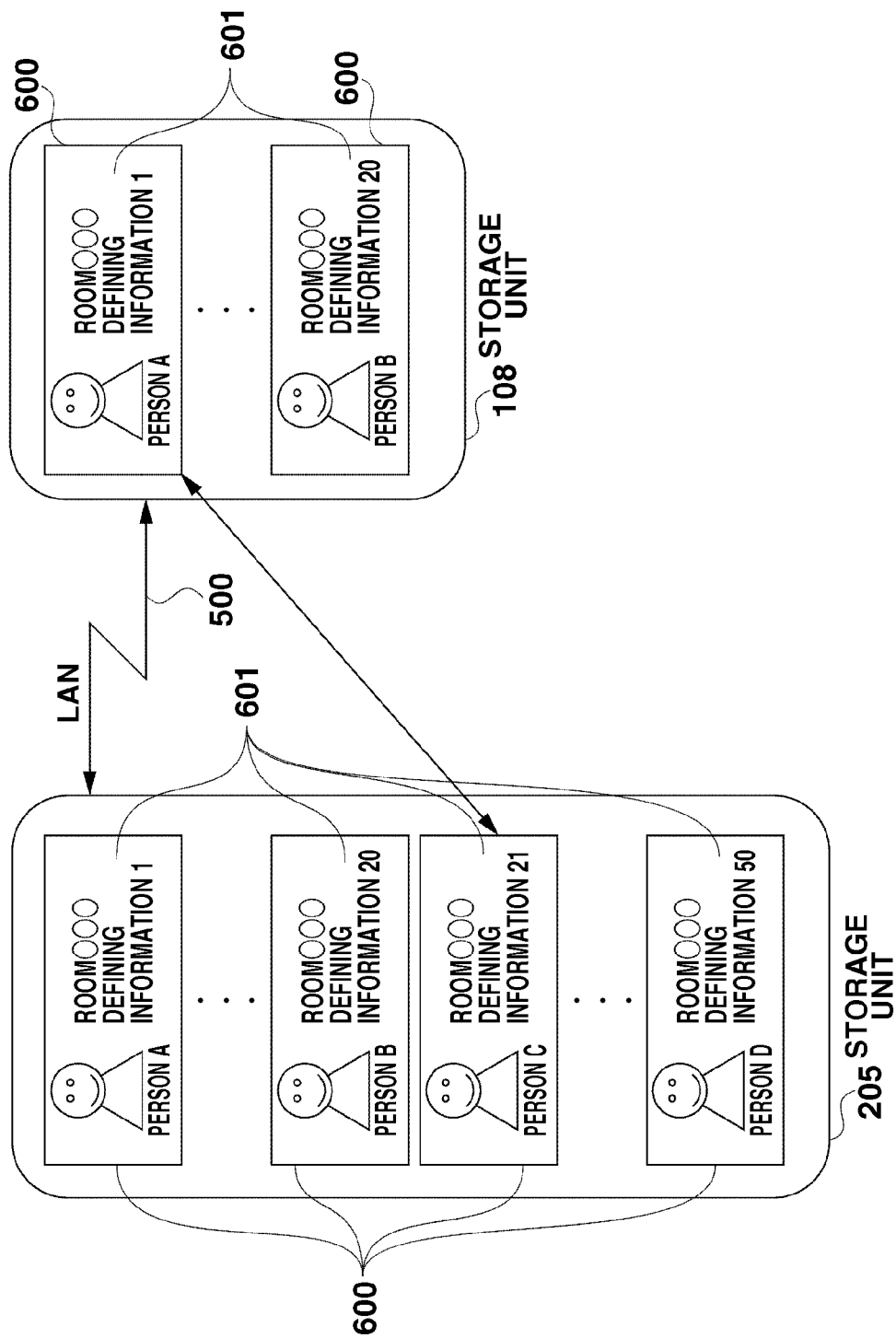

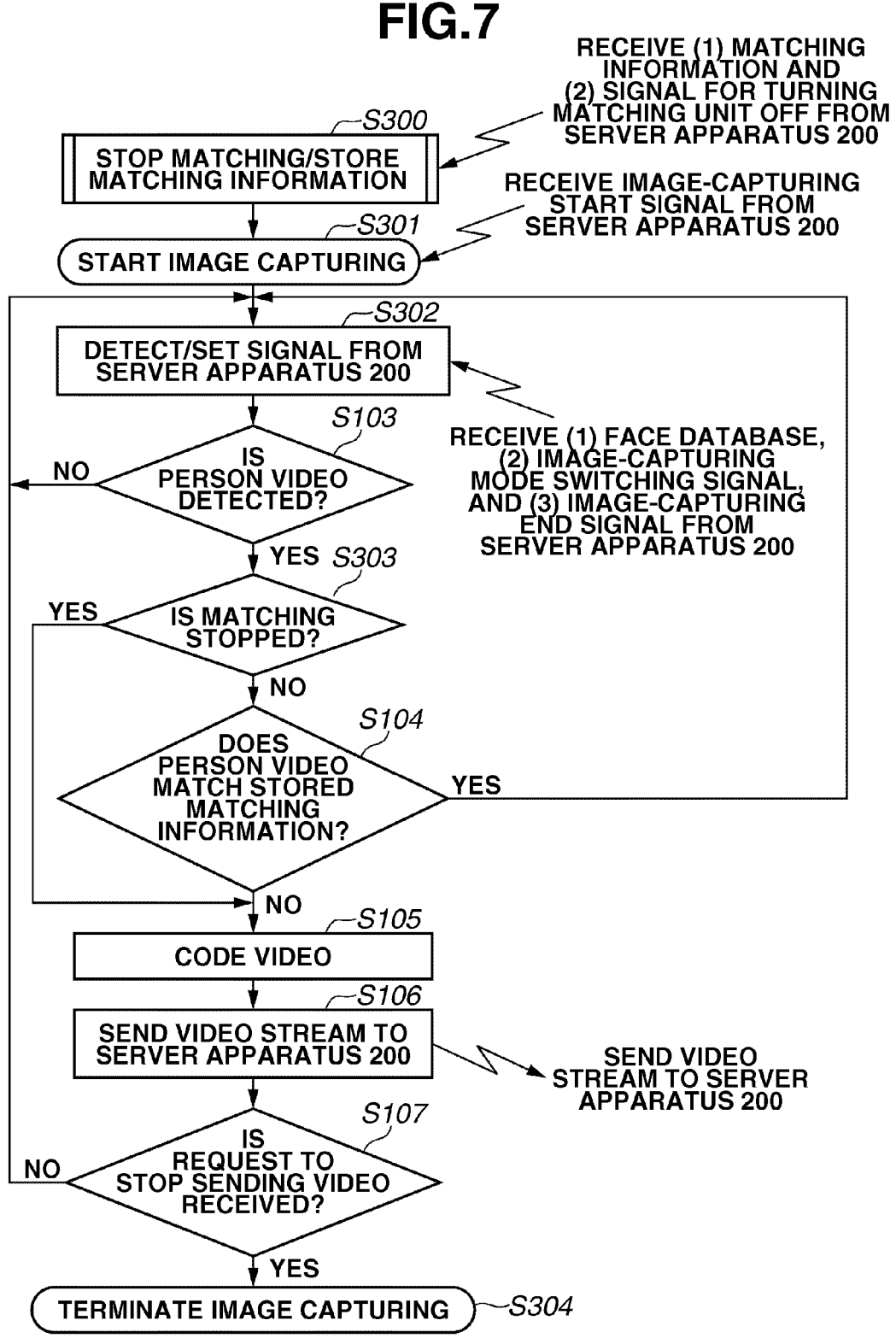

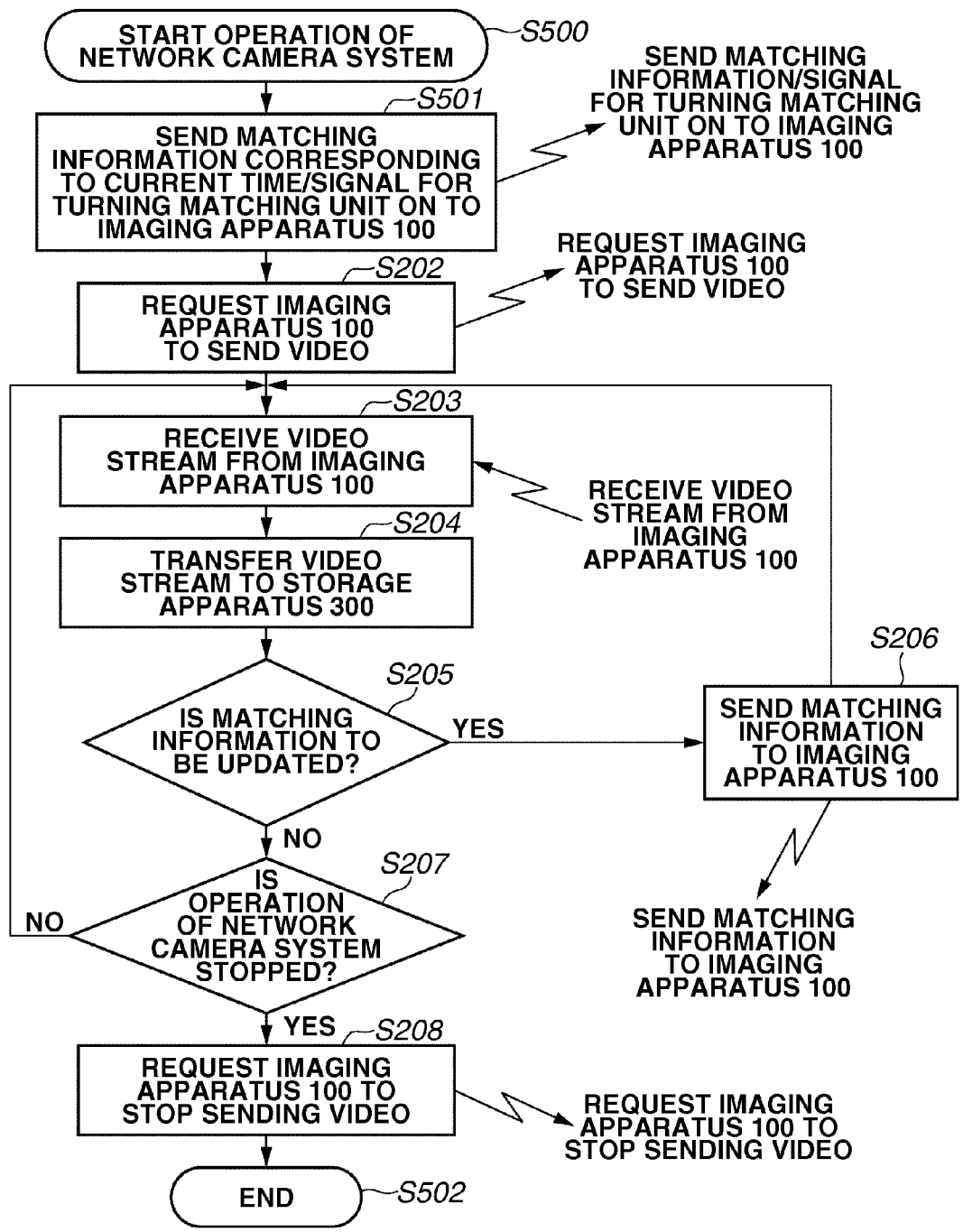

IMAGE MATCHING SYSTEM, PROVIDING APPARATUS, IMAGING APPARATUS, IMAGE MATCHING METHOD, AND PROGRAM

BACKGROUND OF THE INVENTION

1. Field of the Invention

The present invention relates to an image matching system for performing matching between an image captured by an imaging apparatus and previously registered matching information.

2. Description of the Related Art

Conventionally, there has been known an image matching system for performing matching between an image captured with a camera and previously registered matching information, in which a storage server stores the matching information and the camera receives the matching information from the storage server via a network to perform matching.

The matching system is used as an authentication system in which a camera performs matching between a person image captured with the camera and matching information to perform person authentication, or as a monitoring camera for detecting a person that matches matching information and sending an image of the detected person to a computer.

For example, a matching system in which face data is sent to a camera from a computer via a network, and the camera performs face authentication of the sent face data and a face image captured with the camera, and sends, when both are matched with each other, the face image, a camera number, and a photographing time to the computer has been known (Japanese Patent Application Laid-Open No. 2007-158421).

A matching system in which a face authentication server searches for face data when a customer number is sent thereto from a counter terminal, and sends the face data corresponding to the customer number to the counter terminal, and the counter terminal performs face authentication by a face image captured with a camera and the face data sent from the face authentication server has been known (U.S. Patent Application Publication No. US 2005/0224573).

When the camera stores the matching information to perform matching, the amount of memory that can be carried in the camera is limited. Therefore, the number of images that can be matched with a captured image is limited. When an operator gives a request to send matching information that matches a matching object to the camera every time the matching object is matched, a burden is imposed on the operator.

SUMMARY OF THE INVENTION

The present invention is directed to improving, when performing matching between an image stored in a limited amount of memory in a camera and a captured image, a matching probability.

According to an aspect of the present invention, an image matching system in which an imaging apparatus configured to capture an image and a storage unit configured to store matching information are connected to each other via a network and the imaging apparatus performs matching between the matching information and the captured image includes a selection unit configured to select, from among the matching information stored in the storage unit, matching information corresponding to predetermined time, and an updating unit configured to update the matching information to be used by the imaging apparatus to perform matching with the captured image with the matching information selected by the selection unit.

According to another aspect of the present invention, a providing apparatus, connected via network to an imaging apparatus configured to capture an image and to perform matching between matching information and the captured image, for providing matching information stored in a storage unit to the imaging apparatus includes a selection unit configured to select, from among the matching information stored in the storage unit, matching information corresponding to predetermined time, and an updating unit configured to update the matching information to be used by the imaging apparatus to perform matching with the captured image with the matching information selected by the selection unit.

According to yet another aspect of the present invention, an imaging apparatus, connected via a network to a storage unit configured to store matching information, for performing matching between the matching information and a captured image includes a selection unit configured to select, from among the matching information stored in the storage unit, matching information corresponding to predetermined time, and an updating unit configured to update the matching information to be used by the imaging apparatus to perform matching with the captured image with the matching information selected by the selection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart illustrating operations of the server apparatus according to the exemplary embodiment of the present invention.

FIGS. 6A to 6C illustrate matching information according to the exemplary embodiment of the present invention.

FIG. 7 is a flowchart illustrating operations of an imaging apparatus according to an exemplary embodiment of the present invention.

FIG. 9 is a flowchart illustrating operations of the server apparatus during the operation of a network camera system according to the exemplary embodiment of the present invention.

DESCRIPTION OF THE EMBODIMENTS

Various exemplary embodiments, features, and aspects of the invention will be described in detail below with reference to the drawings.

Figure 3:
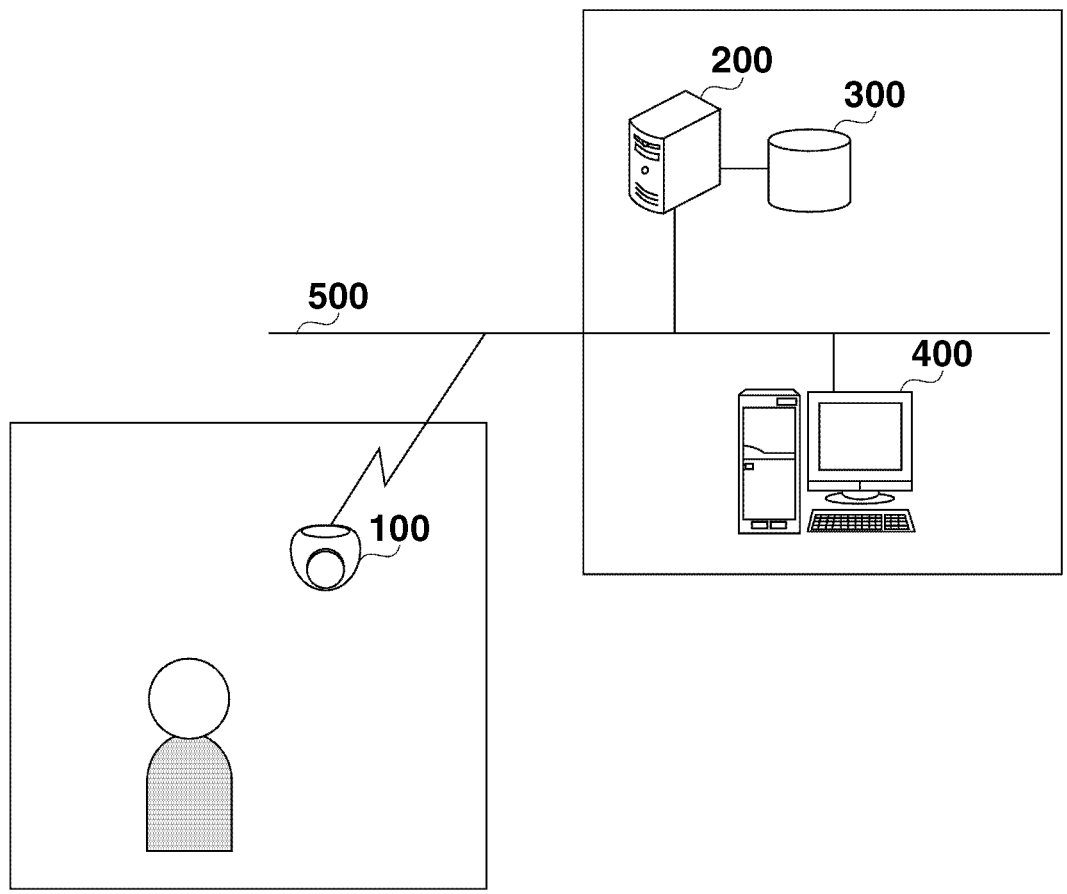
FIG. 3 illustrates a configuration of a network camera system according to the exemplary embodiment of the present invention.

FIG. 3 is a network connection configuration diagram illustrating an operating environment of a network camera system serving as an image matching system. An imaging apparatus 100, a server apparatus 200, a storage apparatus 300, and a display terminal apparatus 400 for browsing a video stored in the storage apparatus 300 are connected to one another via a local area network (LAN) 500 serving as a network line.

The imaging apparatus 100 sends a video stream coded by a coding system, such as Motion-Joint Photographic Experts Group (MJPEG), Moving Picture Experts Group phase 4 (MPEG4), and H.264, and an audio stream recorded from an attached microphone to the server apparatus 200 via the LAN 500.

The server apparatus 200 receives the video stream and the audio stream sent from the imaging apparatus 100. The server apparatus 200 stores matching information. The matching information is used for performing matching with a video captured by the imaging apparatus 100. For example, the matching information includes a face image 600 of each person illustrated in FIG. 6A. The matching information can be generated from not only a face image itself of a person but also only a feature amount by which the person can be specified. Alternatively, the matching information may include not only an image of a person but also an image of any object or its part.

The server apparatus 200 further transfers each of media streams coded by various formats to the external storage apparatus 300. In addition, the server apparatus 200 also has the function of reading out the media streams stored in the storage apparatus 300 in response to a request from the display terminal apparatus 400 and delivering the media streams to the display terminal apparatus 400. The server apparatus 200 is a transmission apparatus for sending matching information to the imaging apparatus 100.

The storage apparatus 300 includes a hard disk device and a recording medium device, and stores the media streams transferred from the server apparatus 200.

The display terminal apparatus 400 requests the server apparatus 200 to receive each of the media streams delivered from the server apparatus 200. The display terminal apparatus 400 receives each of the media streams, then decodes media respectively coded by various formats, and outputs the decoded media.

While the respective numbers of imaging apparatuses 100, server apparatuses 200, storage apparatuses 300, and display terminal apparatuses 400 are not limited to those in the present exemplary embodiment illustrated in FIG. 3, a large number of apparatuses may exist if identifiable by an address or the like. The LAN 500 may be a network such as the Internet or an intranet having a sufficient band to transmit packet data. A physical form of connection to the LAN 500 includes not only wired connection but also wireless connection. The server apparatus 200, the storage apparatus 300, and the display terminal apparatus 400 may be implemented by the same apparatus.

In the network connection configuration, the details of operations of the network camera system according to the present exemplary embodiment will be described.

Figure 1:
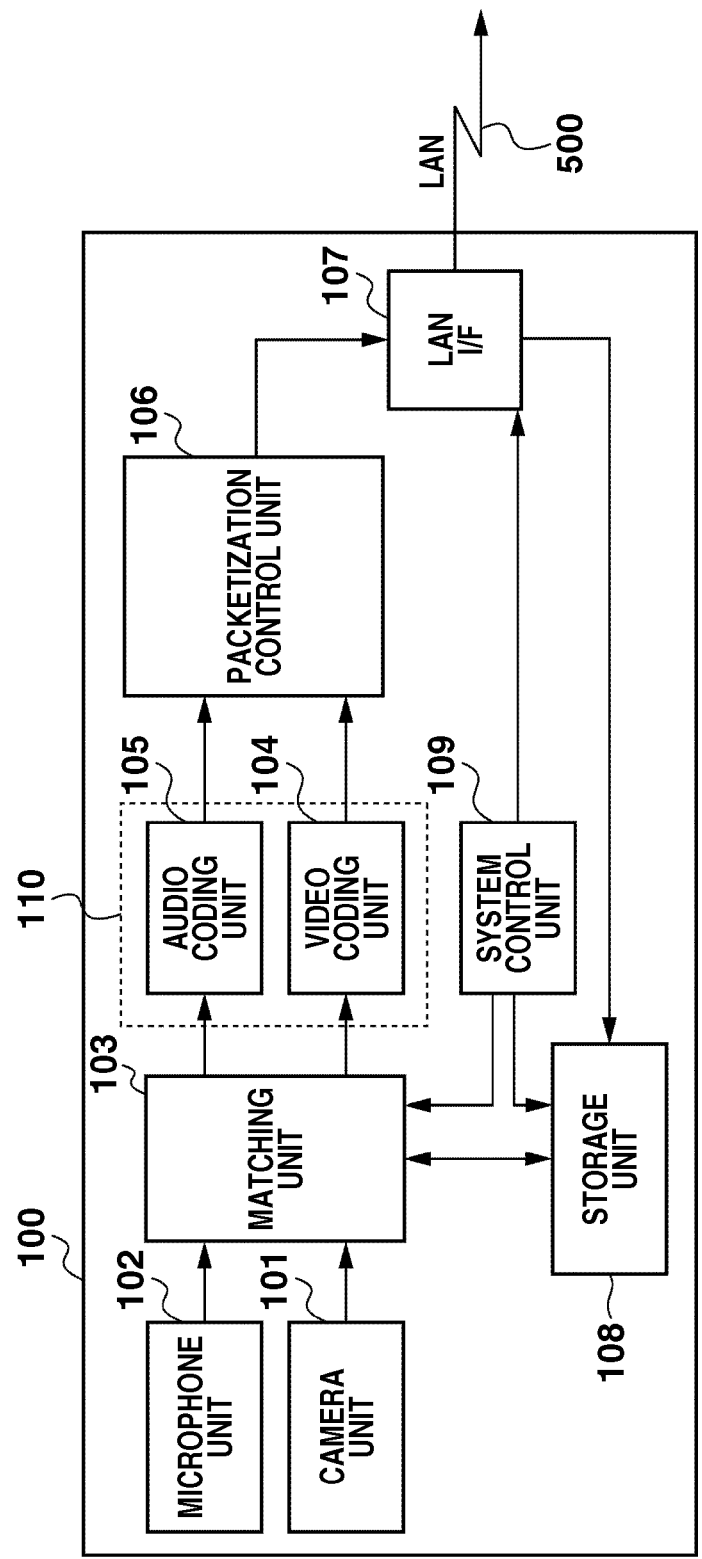
FIG. 1 is a block diagram illustrating a configuration of an imaging apparatus according to an exemplary embodiment of the present invention.

FIG. 1 is a block diagram illustrating a main body of the imaging apparatus 100 according to an exemplary embodiment of the present invention. A camera unit 101 captures an image of an object. The camera unit 101 subjects an image signal obtained by the image capturing in an image sensor such as a complementary metal-oxide semiconductor (CMOS) sensor to signal processing or the like, to output a digital video signal based on a format such as YUV. A microphone unit 102 outputs a digital audio signal based on a format such as Pulse Code Modulation (PCM) on collected sounds.

A matching unit 103 performs matching between a video in the digital video signal output from the camera unit 101 and matching information stored in a storage unit 108. The matching unit 103 also has a switching function for respectively outputting the digital video signal from the camera unit 101 and the digital audio signal from the microphone unit 102 to a video coding unit 104 and an audio coding unit 105 according to a matching result.

The video coding unit 104 compresses and codes the digital video signal from the matching unit 103. The video coding unit 104 subjects the digital video signal to compression and frame rate setting for delivery. A compression system for delivery is based on a predetermined standard, such as MPEG4, H.264, MJPEG, or JPEG.

The audio coding unit 105 compresses and codes the digital audio signal from the matching unit 103. The audio coding unit 105 subjects the digital audio signal to compression and frame rate setting for delivery. A compression system for delivery is based on a predetermined standard, such as Advanced Audio Coding (AAC), G.711, G.722, or Adaptive Multi-Rate (AMR). A video/audio codec unit 110 includes the functions of the video coding unit 104 and the audio coding unit 105, and is implemented by a digital signal processor (DSP) or the like. The audio coding unit 105 is not necessarily required.

A packetization control unit 106 packetizes coded video information and audio information into a video packet and an audio packet. Further, the packetization control unit 106 is arranged according to a predetermined format to output video, audio, and control streams to a local area network interface (LAN I/F) unit 107 according to a predetermined format. The predetermined format includes Hypertext Transfer Protocol (HTTP), and Real-time Transport Protocol (RTP).

The LAN I/F unit 107 receives matching information stored in a storage unit 205 (FIG. 2) in the server apparatus 200. The LAN I/F unit 107 sends the video and audio streams captured and collected by the imaging apparatus 100 to the LAN 500. Further, the LAN I/F 107 implements required adaptation between a communication network and a terminal.

The storage unit 108 stores the matching information received by the LAN I/F unit 107. The storage unit 108 includes a nonvolatile memory, and can dynamically replace the matching information stored in the server apparatus 200.

A system control unit 109 provides signaling for a proper operation. A function provided by the system control unit 109 includes calling control, capacity information exchange, instruction and notification signaling, and opening of a logical channel. The system control unit 109 performs an operation based on a standard such as HTTP or Real Time Streaming Protocol (RTSP), for example. Further, the system control unit 109 controls each of units constituting the imaging apparatus 100. The system control unit 109 also performs control to update the matching information stored in the storage unit 108 with the matching information received from the server apparatus 200.

Figure 2:
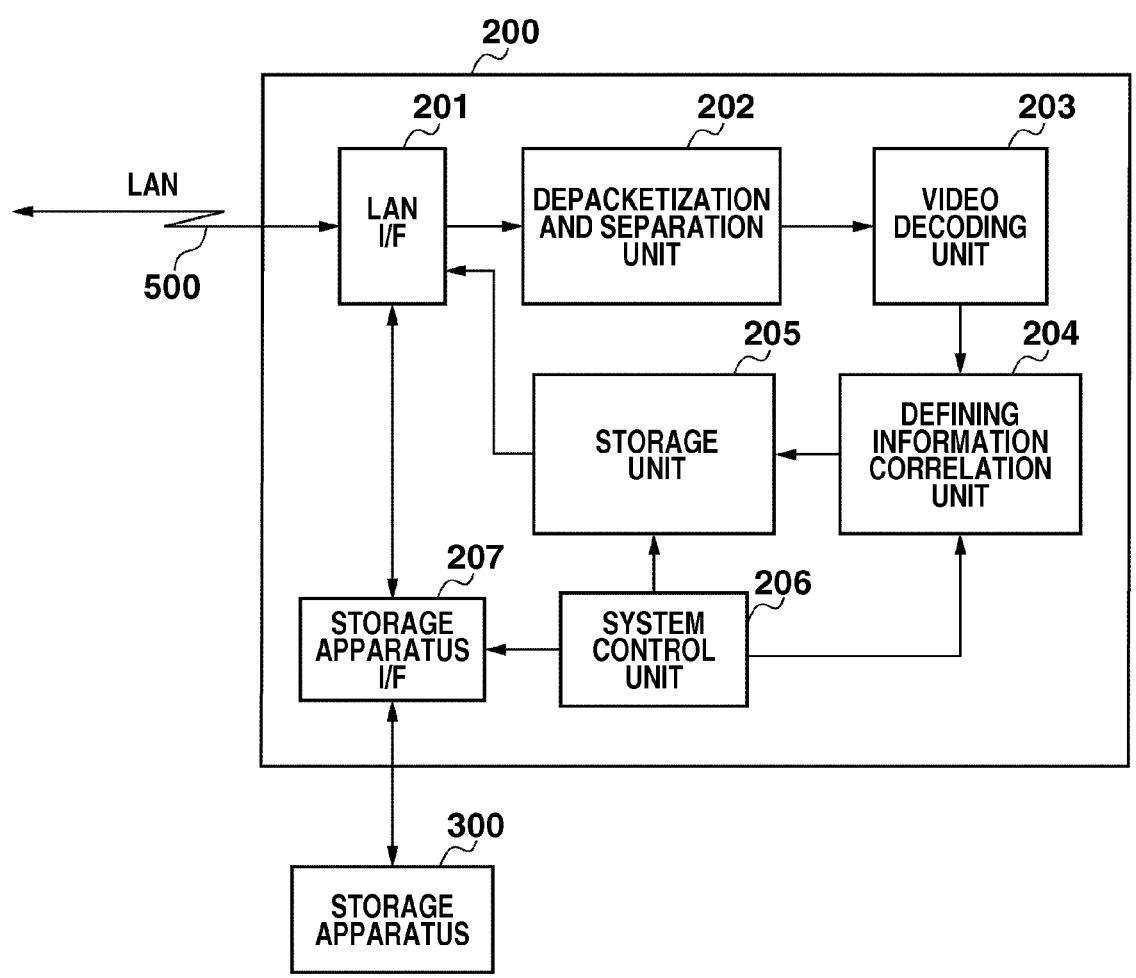
FIG. 2 is a block diagram illustrating a configuration of a server apparatus according to the exemplary embodiment of the present invention.

FIG. 2 is a block diagram illustrating a main body of the server apparatus 200 according to the exemplary embodiment of the present invention. A LAN I/F 201 sends the matching information stored in the storage unit 205 to the LAN 500. The LAN I/F unit 201 receives the video and audio streams sent from the imaging apparatus 100.

A depacketization and separation unit 202 separates a media packet received from the LAN I/F unit 201 into video, audio, and control media, and depacketizes video and audio packets, to constitute a coded video and a coded audio. A video decoding unit 203 decodes the coded video received from the depacketization and separation unit 202 into a digital video signal, and outputs the digital video signal obtained by the decoding to a defining information correlation unit 204.

The defining information correlation unit 204 (hereinafter referred to as the correlation unit 204) stores defining information with the defining information correlated to matching information input from the video decoding unit 203. The defining information is used to define the time at which or the order in which matching information to be sent from the server apparatus 200 to the imaging apparatus 100 is selected.

Figure 6A:
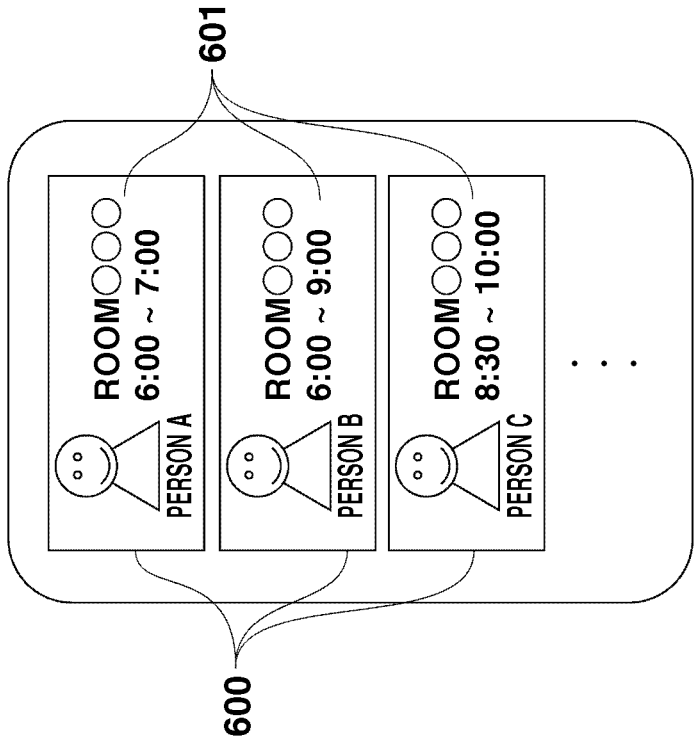
Figure 6B:
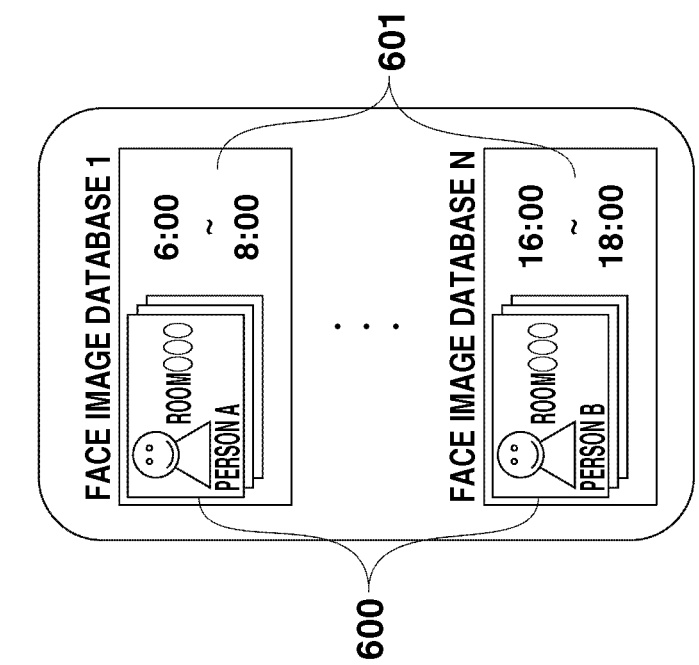

For example, the defining information is time period information representing a time period during which the matching information 600 is stored in the storage unit 108 in the imaging apparatus 100 and used for performing matching, as illustrated in FIGS. 6A and 6B. The correlation unit 204 correlates information relating to the time period during which matching information is stored in the storage unit 108 to the matching information, and switches the matching information stored in the storage unit 108 according to the elapse of time, to define the order in which the matching information to be sent to the imaging apparatus 100 is selected. The defining information may be order information representing the order in which the matching information to be sent to the imaging apparatus 100 is selected, as illustrated in FIG. 6C, for example. Alternatively, the defining information may be the number of times the matching information is used for matching and a time elapsed since it was last used for matching. The matching information can be selected in descending order of the number of times of use or in ascending order of the time elapsed since it was last used for matching. In this case, a switching timing may be each elapse of a predetermined period of time. Alternatively, a switching timing may be determined based on the number of times of use and an elapsed time or may be determined by another method.

The correlation unit 204 outputs the matching information to which the defining information is correlated to the storage unit 205. The matching information and the defining information may be correlated by providing a correspondence table between matching information and defining information in addition to directly adding defining information to matching information, as illustrated in FIGS. 6A to 6C. The details of FIGS. 6A to 6C will be described below.

The storage unit 205 stores the matching information. While the storage unit 205 is provided in the server apparatus 200 in FIG. 2, the storage unit 205 may be provided outside the server apparatus 200. In the present exemplary embodiment, the correlation unit 204 for managing a correlation between matching information and defining information and the storage unit 205 storing matching information are independent of each other. However, correlation and storage of matching information may be performed in one storage apparatus.

A system control unit 206 controls the entire system of the server apparatus 200. The system control unit 206 performs control to refer to the correlation unit 204 to select the matching information from the storage unit 205 in an order defined based on the defining information correlated to the matching information and to transfer the matching information to the imaging apparatus 100 from the storage unit 205 via the LAN I/F unit 201.

A storage apparatus I/F unit 207 directly transfers the video and audio streams sent from the imaging apparatus 100 to the storage apparatus 300 via the LAN I/F unit 201. The storage apparatus I/F unit 207 also transfers the video and audio streams stored in the storage apparatus 300 to the LAN IF unit 201 to send the streams to the display terminal apparatus 400. The storage apparatus 300 includes a hard disk device and a recording media device, for example, storing the video and audio streams sent from the imaging apparatus 100.

Figure 4:
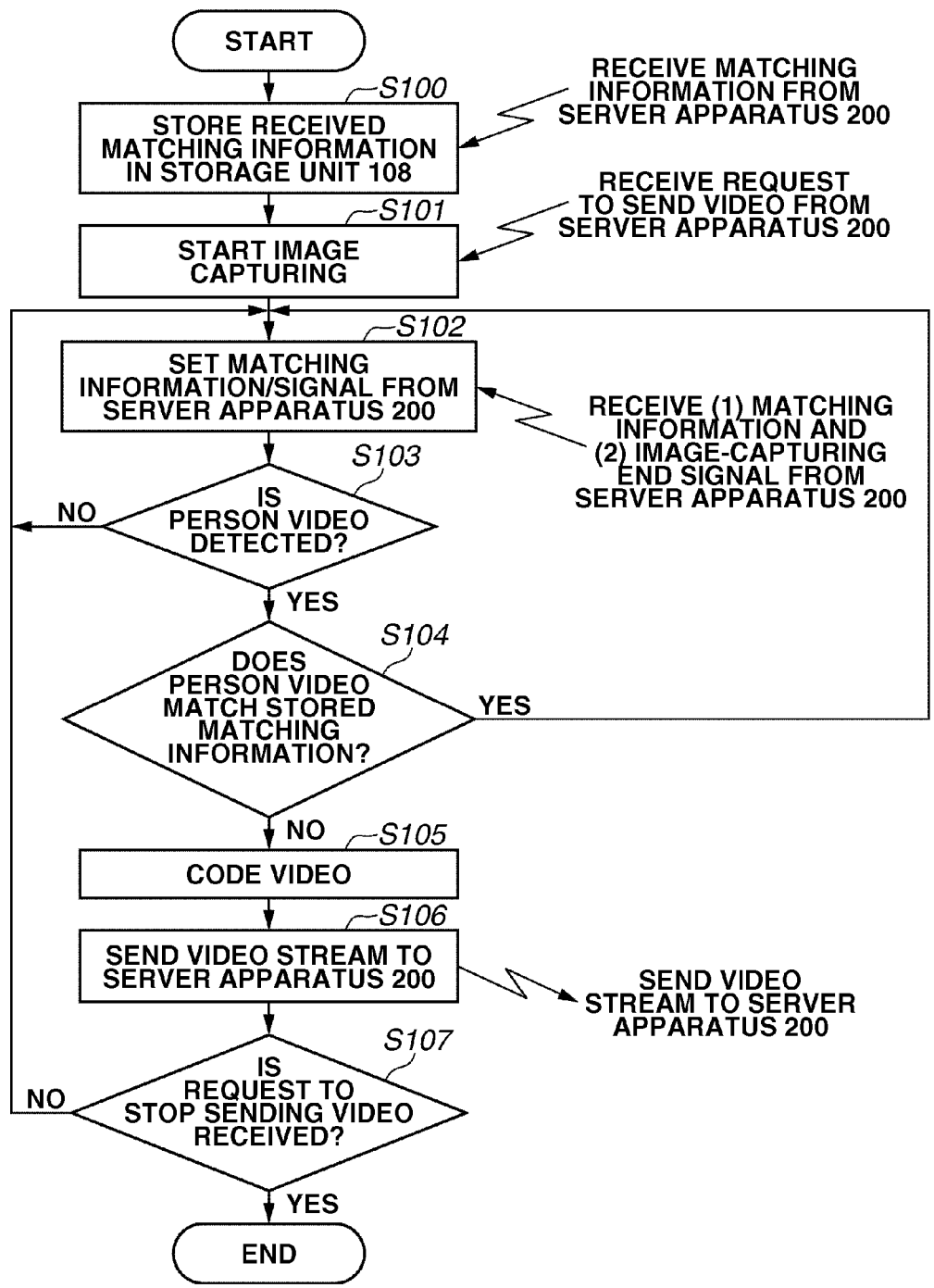
FIG. 4 is a flowchart illustrating operations of an imaging apparatus according to the exemplary embodiment of the present invention.

With the above-mentioned configuration, an image matching operation of the network camera system according to the exemplary embodiment of the present invention will be described. FIG. 4 is a flowchart illustrating operations of the imaging apparatus 100, and FIG. 5 is a flowchart illustrating operations of the server apparatus 200. The operations of the server apparatus 200 may be performed by wireless remote control or the like. In addition, the operations of the server apparatus 200 can also be performed by remote control from the display terminal apparatus 400 illustrated in FIG. 3 via the LAN 500 by providing a function such as a Web server unless the server apparatus 200 is provided with an operation terminal such as a keyboard.

In step S200, the server apparatus 200 stores matching information to be used to perform matching with a video captured by the imaging apparatus 100 in the storage unit 205 via the correlation unit 204 before the network camera system is operated. The correlation unit 204 manages a correlation between the matching information stored in the storage unit 205 and the defining information. Various methods for inputting the matching information stored in the storage unit 205 include a method for automatically generating matching information during matching by providing a database previously stored, e.g., resident registry data and data from a delivery service when the network camera system is installed in an accommodation space, such as an apartment, in addition to manually inputting matching information.

In step S201, the system control unit 206 sends predetermined matching information to the imaging apparatus 100 from the storage unit 205 via the LAN I/F unit 201 when the operation of the network camera system is started. The system control unit 206 has a timing unit for measuring the current time, and sends matching information corresponding to the current time to the imaging apparatus 100. In step S100, the imaging apparatus 100 stores the matching information received from the server apparatus 200 via the LAN I/F unit 107 in the storage unit 108 in the imaging apparatus 100. More specifically, the LAN I/F unit 107 receives the matching information to be used to perform matching with the image captured with the camera unit 101 for capturing an image of an object from the server apparatus 200 via the LAN 500. The storage unit 108 stores the matching information received by the LAN I/F unit 107.

In step S202, the server apparatus 200 requests the imaging apparatus 100 to send a captured video. In step S101, the imaging apparatus 100, which has received the request to send the captured video from the server apparatus 200, starts image capturing with the camera unit 101.

If new matching information is sent to the imaging apparatus 100 from the server apparatus 200 after the image capturing is started, the imaging apparatus 100 updates the matching information stored in the storage unit 108 with the sent matching information under control of the system control unit 109. The matching information stored in the storage unit 108 is updated with the matching information selected by the system control unit 206 according to the time or order defined based on the defining information correlated to the matching information stored in the server apparatus 200. In step S102, the imaging apparatus 100 sets, when it has received an image-capturing end signal from the server apparatus 200, the image-capturing end signal.

In step S103, the imaging apparatus 100 detects a person video from the video captured with the camera unit 101. In step S104, the imaging apparatus 100 performs matching between the person video and the matching information in the storage unit 108 stored in step S100 or S102. More specifically, the matching unit 103 performs matching between the matching information stored in the storage unit 108 and the image captured with the camera unit 101. If the person video captured with the camera unit 101 and a person in the matching information stored in the storage unit 108 do not match each other as a result of the matching (NO in step S104), the processing proceeds to step S105. In step S105, the matching unit 103 transfers the person video to the video/audio codec unit 110, and the video coding unit 104 codes the video.

If the person video matches the person in the matching information stored in the storage unit 108 as a result of the matching (YES in step S104), the matching unit 103 does not transfer the video to the video/audio codec unit 110.

Alternatively, the matching unit 103 need not transfer the captured person video to the video/audio codec unit 110 if the person video does not match the person in the matching information stored in the storage unit 108, and may transfer the person video to the video/audio codec unit 110 if the person video matches the person in the matching information. The video coding unit 104 codes the person video transferred to the video/audio codec unit 110.

The packetization control unit 106 packetizes data representing the person video coded by the video coding unit 104 into an HTTP format, for example. In step S106, the LAN I/F unit 107 sends a video stream obtained by the packetization to the server apparatus 200 via the LAN 500. If the person video matches the person in the matching information stored in the storage unit 108, identification information relating to the person may be sent in place of the person video to the server apparatus 200. Identification information of a data size smaller than that of the person video may be sent in place of the person video so that a load on a network can be reduced.

In step S203, the server apparatus 200 receives the video stream sent from the imaging apparatus 100 from the LAN I/F unit 201. In step S204, the server apparatus 200 directly transfers the packetized video stream to the storage apparatus 300 via the storage apparatus I/F unit 207.

In such a way, the storage apparatus 300 can store only the person video that does not match the person in the matching information stored in the storage unit 108, to consider a person that is not stored in the storage unit 108 as a suspicious person. Alternatively, the storage apparatus 300 can store only a video of a particular person stored in the storage unit 108 by storing only the person video that matches the person in the matching information stored in the storage unit 108.

In step S205, the server apparatus 200 serving as a transmission apparatus then determines whether the matching information stored in the storage unit 108 is to be updated. If the matching information is to be updated (YES in step S205), the processing proceeds to step S206. In step S206, the system control unit 206 refers to the correlation unit 204, selects the matching information from the storage unit 205 in a defined order based on the defining information correlated to the matching information, and sends the matching information to the imaging apparatus 100 from the storage unit 205 via the LAN I/F unit 201 and the LAN 500.

The system control unit 206 thus selects, from among the matching information stored in the storage unit 205, the matching information used for updating the matching information stored in the storage unit 108 according to the time or order defined based on the defining information. The selected matching information is sent to the imaging apparatus 100 from the LAN I/F unit 201, to update the matching information stored in the storage unit 108. The correlation unit 204 stores the defining information for defining the order in which the matching information is selected after correlating the defining information to the matching information stored in the storage unit 205.

If the matching information is not to be updated (NO in step S205), the processing proceeds to step S207. In step S207, the server apparatus 200 determines whether the operation of the network camera system is stopped. If the operation of the network camera system is stopped (YES in step S207), the processing proceeds to step S208. In step S208, the server apparatus 200 finally requests the imaging apparatus 100 to terminate the image capturing and stop sending the captured video. In step S107, the imaging apparatus 100, which has received the request to stop sending the captured video, terminates the image capturing.

The updating of the matching information stored in the storage unit 108 will be described in detail below.

The defining information used for the system control unit 206 to define which of the matching information stored in the storage unit 205 is to be selected from the storage unit 205 is first correlated to the matching information. The defining information can be set by a user's manual input. Alternatively, the server apparatus 200 or the imaging apparatus 100 may automatically set the defining information. The correlation unit 204 stores the defining information with the defining information correlated to the matching information stored in the storage unit 205 based on the setting.

For example, the correlation unit 204 stores information such as a time period, a day, and a day of the week stored in the storage unit 108 in the imaging apparatus 100 in the storage unit 205 after correlating the information to each matching information as defining information so that the matching information is used for matching.

FIG. 6A illustrates an example of a database of the matching information stored in the storage unit 205 by the correlation unit 204. The correlation unit 204 changes each of the matching information input in step S200 into a database for each time period during which the matching information is used for matching, and stores information relating to the time period used for matching in the storage unit 205 after correlating the information to the generated database as defining information.

The matching information can also be generated as one representing each person by not only a face image of the person but only a feature amount by which the person can be specified, as illustrated in FIG. 6A. More matching information can be stored by a limited amount of memory in the camera than that when a face image is stored as matching information by generating the matching information in a feature amount smaller in data size than the face image.

When the operation of the network system is started, the system control unit 206 selects a database (matching information) corresponding to a time at which, a day on which, and a day of the week on which the network camera system is operated from the storage unit 205 based on a time measuring result of a timing unit (not illustrated). The database selected by the system control unit 206 is sent to the imaging apparatus 100 from the storage unit 205 via the LAN I/F unit 201 and the LAN 500. The imaging apparatus 100 updates, when it receives the database, a database stored in the storage unit 108 with the database sent from the server apparatus 200. The order in which matching information to be sent to the imaging apparatus 100 from the server apparatus 200 is selected is thus defined, so that the matching information stored in the storage unit 108 is updated.

A timing unit for measuring a time at which, a day on which, and a day of the week on which the network camera system is operated can be implemented using Network Time Protocol (NTP) or the like. While the timing unit is provided in the server apparatus 200, it may be provided in the imaging apparatus 100 so that the imaging apparatus 100 requests the server apparatus 200 to update matching information. Alternatively, the timing unit may be provided outside the imaging apparatus 100 and the server apparatus 200.

While the correlation unit 204 generates a database for each matching information used in a predetermined time period in FIG. 6A, defining information in different time periods may be respectively correlated for matching information. For example, the correlation unit 204 may store, according to each individual's schedule, defining information in a time period with the defining information correlated to matching information, as illustrated in FIG. 6B.

The matching system according to the present exemplary embodiment updates the matching information stored in the storage unit 108 according to the time period. When the matching information stored in the limited amount of memory is matched with the captured video, therefore, the result that they match each other can be obtained with a higher probability in each time period than in a matching system in which matching information stored in a memory in a camera is not updated. Even in an authentication system in which a memory amount in a camera is limited, the number of objects that can be authenticated during a predetermined period of time can be increased compared to that in the conventional technology. Even in a matching system in which a memory amount in a camera is limited, the accuracy with which an object that matches or does not match the matching information is detected can be more enhanced than that in the conventional technology. Further, the present exemplary embodiment eliminates the need for an operator to require the matching information every time matching is performed, thereby enabling a burden on an operator to be reduced.

The defining information is not limited to information relating to a time period. The defining information may be information relating to the order in which matching information is only selected.

FIG. 6C illustrates an example of defining information. The correlation unit 204 stores the defining information with a number correlated as the defining information to the matching information stored in the storage unit 205. The matching information stored in the storage unit 205 is sent from the storage unit 205 to the storage unit 108 in the order of numbers assigned as the defining information, and the matching information stored in the stored unit 108 is updated with the sent matching information.

In the example illustrated in FIG. 6C, the storage unit 108 first stores pieces of matching information to which pieces of defining information 1 to 20 are respectively correlated. If the matching information to which the defining information 1 is correlated and the captured image match each other, for example, by the matching in the matching unit 103, the server unit 200 sends matching information to which defining information 21 is correlated to the imaging apparatus 100 from the storage unit 205. The system control unit 109 updates the matching information to which the defining information 1 is correlated with the matching information to which the defining information 21 is correlated.

The pieces of matching information are assigned priorities, and the pieces of matching information stored in the storage unit 108 are updated according to the priorities, so that the matching information that has already been matched can be matched after being updated with the matching information having a higher matching probability out of the pieces of matching information stored in the storage unit 205.

The matching information need not be switched when it matches the captured image. The matching information that is stored in the storage unit 108 and to which the pieces of defining information 1 to 20 are correlated may be stored in the storage unit 205 and updated with matching information to which pieces of defining information 21 to 40 are correlated when it does not match the captured image.

Alternatively, the matching information stored in the storage unit 108 may be updated for each predetermined period of time based on the time measurement by the timing unit. When the storage unit 108 stores the matching information to which the pieces of defining information 1 to 20 are correlated, for example, the matching information to which the pieces of defining information 21 to 40 are correlated are sent from the server apparatus 200 to the imaging apparatus 100 after the elapse of a predetermined period of time. The system control unit 109 can update the matching information to which pieces of the defining information 1 to 20 are correlated with the matching information to which the pieces of defining information 21 to 40 are correlated. Alternatively, if the storage unit 108 first stores the matching information to which the pieces of defining information 1 to 20 are correlated, the matching information to which the defining information 21 is correlated is sent from the server apparatus 200 to the imaging apparatus 100 after the elapse of a predetermined period of time. The system control unit 109 can update the matching information to which the defining information 1 is correlated with the matching information to which the defining information 21 is correlated.

The pieces of matching information are assigned priorities, and the pieces of matching information stored in the storage unit 108 are updated according to the priorities, so that the matching information stored in the limited amount of memory and the captured image can be matched with each other in descending order of their matching probabilities. Further, the present exemplary embodiment eliminates the need for the operator to require the matching information every time matching is performed, thereby enabling a burden on the operator to be reduced.

While the matching information stored in the storage unit 108 is updated, the present invention is not limited to the above-mentioned updating manner. For example, the matching information stored in the storage unit 108 may be updated with the matching information selected from the storage unit 205 based on the defining information. While person matching has been described in the present exemplary embodiment, an object to be subjected to matching is not limited to a person. For example, the object may include a vehicle and a license plate of the vehicle.

While the correlation unit 204 is provided in the server apparatus 200 in the present exemplary embodiment, the correlation unit 204 may be provided in the imaging apparatus 100 without departing from the spirit of the present invention. While the system control unit 206 selects the matching information to be sent from the server apparatus 200 to the imaging apparatus 100 in the present exemplary embodiment, the system control unit 109 on the side of the imaging apparatus 100 may select the matching information according to a time or an order defined based on the defining information. The system control unit 109 selects the matching information, and then requests the server apparatus 200 to send the selected matching information to the imaging apparatus 100.

According to the present exemplary embodiment having the above-mentioned configuration, the matching information to which time information corresponding to the time measurement by the timing unit is correlated is selected from the storage unit, to update the matching information stored in the camera. Alternatively, the matching information is selected from the storage unit in an order determined based on the order information for each predetermined period of time or at timing of a matched or unmatched result, to update the matching information stored in the camera. When the matching system for performing matching between the image stored in the limited amount of memory in the camera and the captured image is operated, therefore, the matching probability can be improved. This enables, when matching is performed between the image stored in the limited amount of memory in the camera and the captured image, a matched result to be more frequently obtained. Therefore, even in an authentication system in which a memory amount in a camera is limited, the number of objects that can be authenticated during a predetermined period of time can be more increased than that in the conventional technology. Even if the memory amount in the camera is limited, the accuracy with which the object that matches or does not match the matching information is detected can be enhanced. Further, the present exemplary embodiment eliminates the need for the operator to require the matching information every time matching is performed, thereby enabling a burden on the operator to be reduced.

According to a second exemplary embodiment of the present invention, a network camera system itself generates matching information from a captured image. A different configuration from that in the first exemplary embodiment will be described. The matching unit 103 in the imaging apparatus 100 can switch whether to perform matching between a video captured with a camera unit and matching information stored in the storage unit 108.

The correlation unit 204 in the server apparatus 200 has a face detection function, extracts a face image from a digital video signal output from the video decoding unit 203 under control from the system control unit 206, and generates matching information. A detection function is not limited to face detection. It may use any object or its part as a detection object. The other configuration is similar to that in the first exemplary embodiment and hence, the description thereof is not repeated. Operations of the network camera system according to the second exemplary embodiment will be described below.

The network camera system according to the second exemplary embodiment performs operations in two modes, i.e., a mode for generating matching information required when the system is operated and a mode for performing monitoring using the generated matching information.

Figure 8:
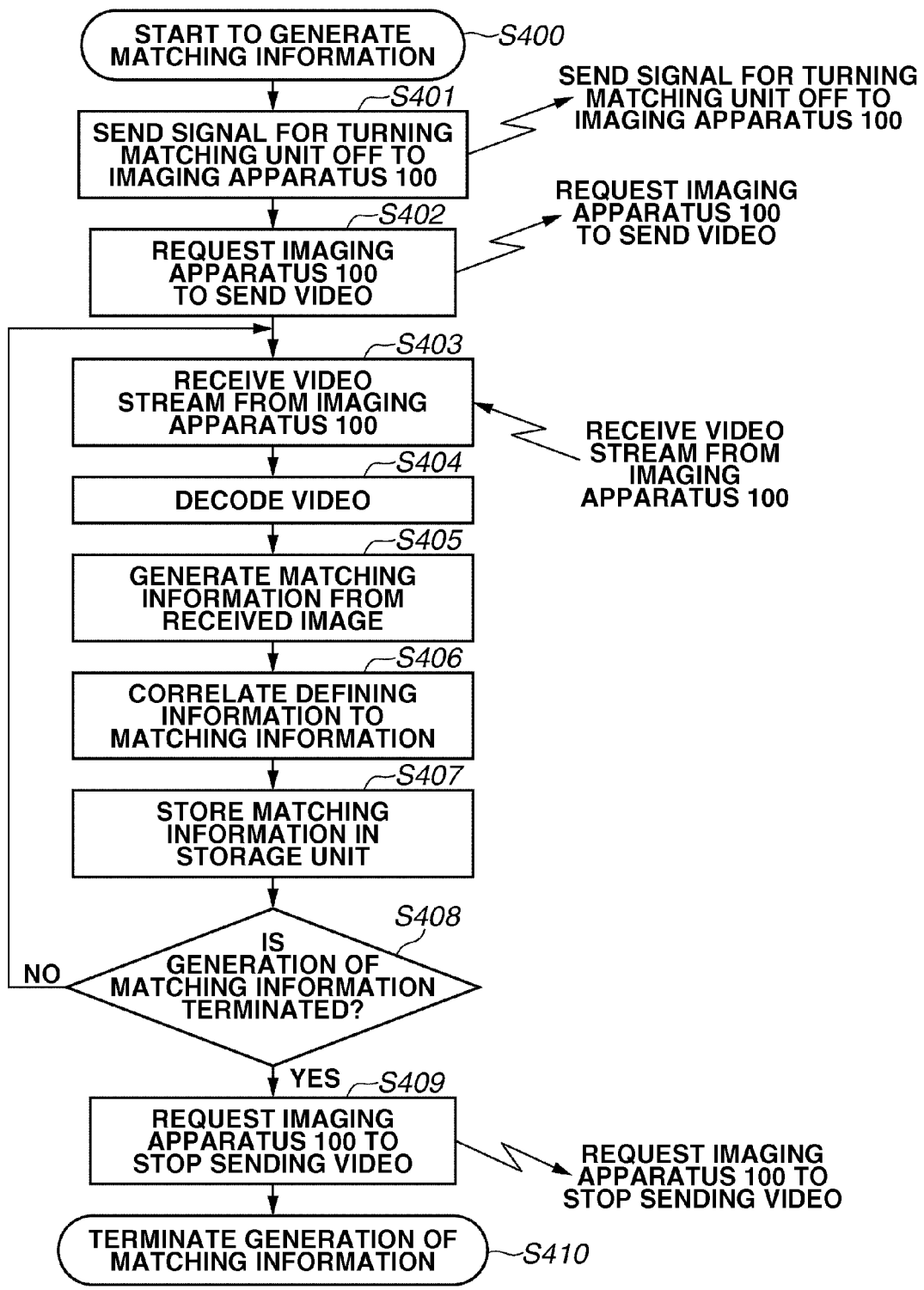
FIG. 8 is a flowchart illustrating operations of a server apparatus during generation of matching information according to the exemplary embodiment of the present invention.

The mode for generating matching information will be first described using operations of the server apparatus 200. FIG. 7 is a flowchart illustrating operations of the imaging apparatus 100, and FIG. 8 is a flowchart illustrating operations of the server apparatus 200 for generating matching information. Steps in which similar processes to those described in FIGS. 4 and 5 are performed are assigned the same step numbers as those in FIGS. 4 and 5.

In step S400, the server apparatus 200 starts to generate matching information. In step S401, the server apparatus 200 first sends a signal for turning the matching unit 103 off to the imaging apparatus 100. In step S300, the imaging apparatus 100, which has received the signal, stops matching by the matching unit 103. In step S402, the server apparatus 200 then requests the imaging apparatus 100 to send a captured video.

In step S301, the imaging apparatus 100, which has received the request, starts to capture a video with the camera unit 101. In step S103, the imaging apparatus 100 detects a person video from the captured video.

If the person video is detected (YES in step S103), the processing proceeds to step S303. In step S303, the imaging apparatus 100 determines whether matching is stopped. If the matching is stopped (YES in step S303), the imaging apparatus 100 transfers the person video to the video/audio codec unit 110 without performing matching between the person video and the matching information stored in the storage unit 108. In step S105, the video coding unit 104 codes the video. A coding system in this case may be a coding system of an image quality sufficient to measure a feature amount of a person required when matching information is generated, for example, H.264 and MJPEG. In step S106, the packetization control unit 106 packetizes data representing the coded video into an HTTP format, and the LAN I/F unit 107 sends a video stream to the server apparatus 200 via the LAN 500.

In step S403, the server apparatus 200 receives the video stream sent from the imaging apparatus 100 from the LAN I/F unit 201. The depacketization and separation unit 202 depacketizes the received video stream, and transfers the depacketized video stream to the video decoding unit 203. In step S404, the video decoding unit 203 decodes the coded video data, and transfers the decoded video data to the correlation unit 204.

The correlation unit 204 generates matching information based on a captured person image. In step S405, the correlation unit 204 extracts a face image from a digital video signal output from the video decoding unit 203, to generate matching information.

In step S406, the correlation unit 204 then correlates defining information with the generated matching information.

For example, the correlation unit 204 generates an image database for each predetermined time period such as 6:00 to 8:00 or for each day of the week, as illustrated in FIG. 6A. The correlation unit 204 respectively registers person images captured for each predetermined period of time in image databases corresponding to time periods during which the person images are captured. When the same person image is captured in different time periods, the person image may be registered in an image database corresponding to the time period during which it is finally captured or the time period during which it is captured a large number of times.

The correlation unit 204 may correlate to a particular person image information relating to a time period during which the person image is captured a large number of times as defining information, as illustrated in FIG. 6B. Alternatively, the correlation unit 204 may determine priorities to be assigned to matching information according to the frequency of image capturing and respectively correlate the priorities to the matching information as defining information, as illustrated in FIG. 6C.

In step S407, the correlation unit 204 transfers the matching information thus generated to the storage unit 205 to store the matching information. While a defining information correlation unit is provided in the server apparatus 200 in the present exemplary embodiment, the defining information correlation unit may be provided in the imaging apparatus 100 without departing from the spirit of the present invention.

In step S408, the server apparatus 200 determines whether the person image captured for a predetermined period of time can be registered in the stored unit 205. If the person image can be registered (YES in step S408), the processing proceeds to step S409. In step S409, the server apparatus 200 requests the imaging apparatus 100 to terminate image capturing and stop sending the captured image. In step S410, the server apparatus 200 terminates generation of the image databases.

Operations performed when the network camera system is operated will be described below using the generated matching information. FIG. 7 is a flowchart illustrating operations of the imaging apparatus 100, and FIG. 9 is a flowchart illustrating operations of the server apparatus 200 in the network camera system.

In step S501, the server apparatus 200 first sends a signal for turning the matching unit 103 on and matching information corresponding to the time when the operation of the network camera system is started from the storage unit 205 to the imaging apparatus 100. The system control unit 206 has a timing unit, and sends matching information corresponding to the current time to the imaging apparatus 100. In step S300, the imaging apparatus 100, which has received the signal for turning the matching unit 103 on and the matching information from the server apparatus 200, turns the matching unit 103 on, and further stores the matching information in the storage unit 108 in the imaging apparatus 100.

In step S202, the server apparatus 200 then requests the imaging apparatus 100 to send the captured video. In step S301, the imaging apparatus 100, which has received the request, starts to capture the video with the camera unit 101. In step S103, the imaging apparatus 100 detects a person from the video captured with the camera unit 101.

If the matching is not stopped (NO in step S303), the processing proceeds to step S104. In step S104, the imaging apparatus 100 performs matching, while the person is detected, between a video of the person and the matching information registered and set in the storage unit 108. Subsequent manner of sending of a video stream, updating of matching information, and termination of image capturing corresponding to a matching result are similar to those in the first exemplary embodiment and hence, the description thereof is not repeated.

The network camera system according to the second exemplary embodiment automatically generates matching information from a captured image, and correlates the generated matching information to defining information. Therefore, a network camera system for performing matching between matching information stored in a limited amount of memory and the captured video with a high probability of matched results can be more autonomously operated. Further, the present exemplary embodiment eliminates the need for an operator to require the matching information every time matching is performed, thereby enabling a burden on the operator to be reduced.

In a third exemplary embodiment of the present invention, a network camera system automatically updates defining information correlated with matching information stored in the storage unit 205.

A different configuration from that in the first exemplary embodiment will be described below. The server apparatus 200 in the third exemplary embodiment can perform matching between a video received from the imaging apparatus 100 and matching information stored in the storage unit 205. The correlation unit 204 may have a matching function. Alternatively, a matching unit may be provided in the server apparatus 200. The other configuration is similar to that in the first or second exemplary embodiment and hence, the description thereof is not repeated. Operations of the network camera system according to the third exemplary embodiment will be described below.

First, the network camera system according to the third exemplary embodiment stores matching information and correlates defining information thereto, like in the first or second exemplary embodiment. When the operation of the network camera system is started, the imaging apparatus 100 detects a person from a video captured with the camera unit 101, and performs matching between the person video and the matching information stored in the storage unit 108.

If the captured person video does not match a person in the matching information stored in the storage unit 108 as a result of the matching, the person video is transferred to the video/audio codec unit 110, and the video coding unit 104 codes the captured person video. If the captured person video matches the person in the matching information stored in the storage unit 108 as a result of the matching, the person video is not transferred to the video/audio codec unit 110.

The server apparatus 200 receives a video stream sent from the imaging apparatus 100 from the LAN I/F unit 201. The depacketization and separation unit 202 depacketizes the received video stream, and transfers the depacketized video stream to the video decoding unit 203. The video decoding unit 203 decodes data representing the coded video, and transfers the decoded video data to the correlation unit 204. The correlation unit 204 extracts a face image from a digital video signal output from the video decoding unit 203, and determines whether the extracted face image matches the matching information stored in the storage unit 205. The matching between the image sent from the imaging apparatus 100 and the matching information stored in the storage unit 205 may be performed not by the correlation unit 204 but by a matching unit provided in the server apparatus 200.

If the extracted face image and the matching information stored in the storage unit 205 match each other as a result of the matching, defining information correlated to the matching information is updated, and defining information corresponding to a time at which, a time period during which, a date on which, or a day of the week on which the image that matches the matching information is captured is correlated to the matching information. Alternatively, the defining information correlated to the matching information may be updated only when the frequency at which a face image extracted from a video sent from the imaging apparatus 100 matches particular matching information stored in the storage unit 205 is a predetermined value or more.

The subsequent manner of updating of matching information and termination of image capturing are similar to those in the first exemplary embodiment and hence, the description thereof is not repeated.

The network camera system according to the third exemplary embodiment automatically updates defining information correlated to matching information. More specifically, if matching information selected according to a time or an order defined by the defining information stored in the storage unit 205 and the captured image do not match each other, the defining information stored in the storage unit 205 is updated. This enables the probability that matching information and a captured image match each other to be increased by matching after the updating. Therefore, matching between matching information stored in a limited amount of memory and a captured video can be performed with a higher probability of matched results than that in the conventional matching system. Further, the present exemplary embodiment eliminates the need for an operator to require matching information every time matching is performed, thereby enabling a burden on the operator to be reduced.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-217331 filed Sep. 18, 2009, which is hereby incorporated by reference herein in its entirety.

What is claimed is:

1. An image matching system comprising:
an external storage apparatus and an imaging apparatus connected to the external storage apparatus via a network, wherein
the external storage apparatus comprises:
a first storage unit configured to store a plurality of pieces of feature information to specify respective objects and to store time information indicating time at which each piece of the feature information is sent to the imaging apparatus;
a selection unit configured to select, from the plurality of pieces of feature information stored in the first storage unit, a piece of feature information corresponding to current time measured by a timing unit, based on the time information stored in the first storage unit; and
a first sending unit configured to send, to the imaging apparatus, the selected piece of feature information corresponding to current time measured by the timing unit; and
wherein the imaging apparatus comprises:
a second storage unit configured to store one or more pieces of feature information;
a specifying unit configured to specify whether one or more objects corresponding to the one or more pieces of feature information stored in the second storage unit exist in an image captured by the imaging apparatus;
a receiving unit configured to receive, from the external storage apparatus, the piece of feature information selected by the selecting unit; and
an updating unit configured to update the one or more pieces of feature information stored in the second storage unit with the piece of feature information received from the external storage apparatus, the received piece of feature information corresponding to the current time.

2. The image matching system according to claim 1, further comprising:
a generation unit configured to generate, from the captured image, feature information which includes feature information of an object to be detected,
wherein the external storage apparatus stores feature information generated from a third captured image by the generation unit, and
wherein the receiving unit is configured to receive the generated feature information based on time at which the third captured image was captured.

3. The image matching system according to claim 1, wherein the imaging apparatus includes a second sending unit configured to send to the external storage apparatus an image of an object that does not have a feature corresponding to feature information received by the receiving unit in the captured image.

4. The image matching system according to claim 1, wherein the imaging apparatus includes a second sending unit configured to send to the external storage apparatus an image of an object that does not have a feature corresponding to feature information received by the receiving unit, the image of the object that does not have the feature corresponding to received feature information being a part of the imaging apparatus; and
wherein, if the object of the image sent by the second sending unit has a feature corresponding to feature information included in one of the plurality of pieces of feature information that is stored in the external storage apparatus and is not selected by the selection unit, the first storage unit stores time at which the sent image was captured.

5. The image matching system according to claim 1, wherein the plurality of pieces of feature information are assigned a priority to match the plurality of pieces of feature information with a captured image in descending order of the priority based on matching probabilities.

6. The image matching system according to claim 1, wherein the updating unit is configured to update, out of a foreground image and a background image of the captured image, feature information of the foreground image.

7. The image matching system according to claim 4,
wherein the first sending unit is configured to send, at a first time corresponding to the time at which the sent image was captured, an unmatched image sent by the second sending unit that has a feature corresponding to feature information included in one of the plurality of pieces of feature information that is stored in the external storage apparatus and is not selected by the selection unit, and
wherein the specifying unit is configured to specify whether an image corresponding to the unmatched image is included in the captured image during a period including the first time.

8. An image matching system comprising:
an external storage apparatus and an imaging apparatus connected to the external storage apparatus via a network, wherein
the external storage apparatus comprises:
a first storage unit configured to store a plurality of pieces of feature information to specify respective objects and to store order information indicating a predetermined order in which the feature information is sent to the imaging apparatus;
a selection unit configured to select, from the plurality of pieces of feature information stored in the first storage unit, a piece of feature information corresponding to current time measured by a timing unit, based on the order information stored in the first storage unit; and
a first sending unit configured to send, to the imaging apparatus, the selected piece of feature information corresponding to the predetermined order and current time measured by the timing unit; and
wherein the imaging apparatus comprises:
a second storage unit configured to store one or more pieces of feature information:
a specifying unit configured to specify whether one or more objects corresponding to the one or more pieces of feature information stored in the second storage unit exist in an image captured by the imaging apparatus;

a receiving unit configured to receive in a predetermined order, the piece of feature information selected by the selecting unit; and an updating unit configured to update, at a predetermined timing, the one or more pieces of feature information stored in the second storage unit with the piece of feature information received from the external storage apparatus, the received piece of feature information corresponding to the predetermined order of the feature information and the current time measured by the timing unit.

9. The image matching system according to claim 8, wherein the imaging apparatus includes a second sending unit configured to send to the external storage apparatus an image of an object that does not have a feature corresponding to feature information received by the receiving unit in the captured image, the image of the object that does not have the feature corresponding to received feature information being a part of the imaging apparatus.

10. The image matching system according to claim 8, wherein the plurality of pieces of feature information selected in the predetermined order are assigned a priority to match the plurality of pieces of feature information with a captured image in descending order of the priority based on matching probabilities.

11. A providing apparatus, connected via a network to an imaging apparatus, comprising a specifying unit configured to specify whether one or more objects corresponding to the one or more pieces of feature information stored in a storage unit of the imaging apparatus exist in an image captured by the imaging apparatus, the providing apparatus comprising:

a first storage unit configured to store a plurality of pieces of feature information to specify respective objects and to store time information indicating time at which each piece of the feature information is sent to the imaging apparatus;

a selection unit configured to select, from the plurality of pieces of feature information stored in the first storage unit, a piece of feature information corresponding to current time measured by a timing unit, based on the time information stored in the first storage unit;

a providing unit configured to provide to the imaging apparatus via the network, the selected piece of first feature information; and an updating unit configured to update one or more pieces of feature information stored in a second storage unit of the imaging apparatus with the piece of feature information provided by the providing unit, the provided piece of feature information corresponding to the current time.

12. The providing apparatus according to claim 11, further comprising a generation unit configured to generate the feature information from the captured image, wherein the first storage unit stores third feature information generated from a third captured image by the generation unit, and wherein the providing unit provides to the imaging apparatus the third feature information based on time at which the third captured image was captured.

13. The providing apparatus according to claim 11, wherein the plurality of pieces of feature information are assigned a priority to match the plurality of pieces of feature information with a captured image in descending order of the priority based on matching probabilities.

14. A providing apparatus connected via a network to an imaging apparatus comprising a specifying unit configured to specify whether one or more objects corresponding to the one or more pieces of feature information stored in a storage unit of the imaging apparatus exist in an image captured by the imaging apparatus, the providing apparatus comprising:

a first storage unit configured to store a plurality of pieces of feature information to specify the respective objects and to store order information indicating a predetermined order in which the feature information is sent to the imaging apparatus;

a selection unit configured to select, from the plurality of pieces of feature information stored in the first storage unit, a piece of feature information corresponding to current time measured by a timing unit, based on the order information stored in the first storage unit;

a providing unit configured to provide in the predetermined order to the imaging apparatus via the network, the selected piece of feature information corresponding to the predetermined order and current time measured by the timing unit; and an updating unit configured to update, at a predetermined timing, the one or more pieces of feature information stored in the second storage unit with the piece of feature information provided from the providing unit, the provided piece of feature information corresponding to the predetermined order of the feature information and the current time measured by the timing unit.

15. The providing apparatus according to claim 14, wherein the plurality of pieces of feature information are assigned a priority to match the plurality of pieces of feature information with a captured image in descending order of the priority based on matching probabilities.

16. An imaging apparatus, connected via a network to an external storage apparatus configured to store a plurality of pieces of feature information to specify respective objects and to store time information indicating time at which each piece of the feature information is sent to the imaging apparatus, the imaging apparatus comprising:

a memory;

one or more processors coupled to the memory which executes the following:

controlling to store one or more pieces of feature information in a storage unit of the imaging apparatus;

specifying whether one or more objects corresponding to the one or more pieces of feature information stored in the storage unit exist in an image captured by the imaging apparatus;

measuring a time;

selecting, from the plurality of pieces of feature information stored in the external storage apparatus, a piece of feature information corresponding to current time measured, based on the time information stored in the external storage apparatus;

receiving, from the external storage apparatus via the network, the selected piece of feature information; and updating the one or more pieces of feature information having been used by the imaging apparatus with the first feature information stored in the storage unit with the piece of feature information received from the external storage apparatus, the received piece of feature information corresponding to the current time.

17. The imaging apparatus according to claim 16, further comprising:

a sending unit configured to send to the external storage apparatus an image of an object that does not have a feature corresponding to feature information received by the receiving unit, the image of the object that does not have a feature information being a part of the captured image captured by the imaging apparatus.

18. The providing apparatus according to claim 16, wherein the plurality of pieces of feature information are assigned a priority to match the plurality of pieces of feature information with a captured image in descending order of the priority based on matching probabilities.

19. An image matching method in an image matching system, the image matching method comprising:
storing, in an external storage apparatus, a plurality of pieces of feature information to specify respective objects and storing time information indicating time at which each piece of the feature information is sent to the imaging apparatus;
selecting, from the plurality of pieces of feature information stored in the external storage apparatus, a piece of feature information corresponding to current time measured by a timing unit, based on the time information stored in the external storage apparatus; and
sending, from the external storage apparatus to the imaging apparatus, the selected piece of feature information corresponding to current time measured by the timing unit;
storing in an imaging apparatus connected to the external storage apparatus via a network, one or more pieces of feature information;
specifying, by the imaging apparatus, whether one or more objects corresponding to the one or more pieces of feature information stored in the imaging apparatus exist in an image captured by the imaging apparatus;
receiving, by an imaging apparatus, from the external storage apparatus, the piece of feature information selected; and
updating, by the imaging apparatus, the one or more pieces of feature information stored in the imaging apparatus with the piece of feature information received from the external storage apparatus, the received piece of feature information corresponding to the current time.

20. The image matching method according to claim 19, further comprising:
generating, from the captured image, the feature information, storing in the external storage apparatus third feature information generated from a third captured image, and selecting the third feature information based on time at which the third image was captured.

21. A non-transitory computer-readable storage medium storing computer-executable instructions for a computer connected via a network to an imaging apparatus comprising a specifying unit configured to specify whether one or more objects corresponding to the one or more pieces of feature information stored in a storage unit of the imaging apparatus exist in an image captured by the imaging apparatus, the computer-executable instructions comprising:
storing, in a first storage unit, a plurality of pieces of feature information to specify the respective objects and to store order information indicating a predetermined order in which the feature information is sent to the imaging apparatus;
selecting, from the plurality of pieces of feature information stored in the first storage unit, a piece of feature information corresponding to current time measured by a timing unit, based on the time information stored in the first storage unit;
providing to the imaging apparatus via the network, the selected piece of feature information; and
updating one or more pieces of feature information stored in a second storage unit of the imaging apparatus with the piece of feature information provided, the provided piece of feature information corresponding to the current time.

22. The non-transitory computer-readable storage medium according to claim 21, wherein the computer-executable instructions further comprise generating the feature information from the captured image, storing third feature information generated from a third captured image, and providing, to the imaging apparatus, the third feature information based on time at which the third captured image was captured.

23. An imaging apparatus, connected via a network to an external storage apparatus configured to store a plurality of pieces of feature information to specify respective objects and to store time information indicating a predetermined order in which the feature information is sent to the imaging apparatus, the imaging apparatus comprising:
a memory;
one or more processors coupled to the memory which executes the following:
controlling to store one or more pieces of feature information in a storage unit of the imaging apparatus;
specifying whether one or more objects corresponding to the one or more pieces of feature information stored in the storage unit exist in an image captured by the imaging apparatus;
measuring a time;
selecting, from the plurality of pieces of feature information stored in the external storage apparatus, a piece of feature information corresponding to current time measured, based on the order information stored in the external storage apparatus;
receiving in the predetermined order, from the external storage apparatus, the selected piece of feature information; and
updating at a predetermined timing the one or more pieces of feature information stored in the storage unit with the piece of feature information received from the external storage apparatus, the received piece of feature information corresponding to the predetermined order of the feature information and the current time measured by the timing unit.

24. A non-transitory computer-readable storage medium that stores computer-executable instructions for controlling an imaging apparatus connected via a network to an external storage apparatus configured to store a plurality of pieces of feature information to specify respective objects and to store time information indicating a predetermined order in which feature information is sent to the imaging apparatus, the medium comprising:
computer-executable instructions for controlling to store one or more pieces of feature information in a storage unit of the imaging apparatus;
computer-executable instructions for specifying whether one or more objects corresponding to the one or more pieces of feature information stored in the storage unit exist in an image captured by the imaging apparatus;
computer-executable instructions for measuring a time;
computer-executable instructions for selecting, from the plurality of pieces of feature information stored in the external storage apparatus, a piece of feature information corresponding to current time measured, based on the order information stored in the external storage apparatus;
computer-executable instructions for receiving, from the external storage apparatus via the network, the selected piece of feature information; and
computer-executable instructions for updating the one or more pieces of feature information stored in the storage unit with the piece of feature information received from the external storage apparatus, the received piece of feature information corresponding to the current time.

25. A non-transitory computer-readable storage medium that stores computer-executable instructions for controlling an imaging apparatus connected via a network to an external storage apparatus configured to store a plurality of pieces of feature information to specify respective objects and to store time information indicating a predetermined order in which the feature information is sent to the imaging apparatus, the medium comprising:
   computer-executable instructions for controlling to store one or more pieces of feature information in a storage unit of the imaging apparatus;
   computer-executable instructions for specifying whether one or more objects corresponding to the one or more pieces of feature information stored in the storage unit exist in an image captured by the imaging apparatus;
   computer-executable instructions for measuring a time;
   computer-executable instructions for selecting, from the plurality of pieces of feature information stored in the external storage apparatus, a piece of feature information corresponding to current time measured, based on the order information stored in the external storage apparatus;
   computer-executable instructions for receiving in the predetermined order, from the external storage apparatus, the selected piece of feature information; and
   computer-executable instructions for updating at a predetermined timing the one or more pieces of feature information stored in the storage unit with the piece of feature information received from the external storage apparatus, the received piece of feature information corresponding to the predetermined order of the feature information and the current time measured by the timing unit.

* * * * *